United States Patent [19]

Nunally

[11] Patent Number: 5,263,122
[45] Date of Patent: Nov. 16, 1993

[54] NEURAL NETWORK ARCHITECTURE

[75] Inventor: Patrick O. Nunally, Diamond Bar, Calif.

[73] Assignee: Hughes Missile Systems Company, Los Angeles, Calif.

[21] Appl. No.: 689,165

[22] Filed: Apr. 22, 1991

[51] Int. Cl.5 .............................................. G06F 15/18
[52] U.S. Cl. ................................................ 395/27
[58] Field of Search ................... 395/24, 27; 364/200; 381/48

[56] References Cited

U.S. PATENT DOCUMENTS

| | | | |
|---|---|---|---|
| 3,211,832 | 10/1965 | Putzrath | 395/24 |
| 3,245,050 | 4/1966 | McGrogan, Jr. | 395/24 |
| 3,308,441 | 6/1963 | Dusheck, Jr. | 395/24 |
| 3,469,034 | 9/1969 | Stewart | 381/48 |
| 3,638,196 | 1/1972 | Nishiyama | 395/24 |
| 3,950,733 | 4/1976 | Cooper et al. | 340/172.5 |
| 4,193,115 | 3/1980 | Albus | 364/900 |
| 4,479,241 | 10/1984 | Buckley | 382/15 |
| 4,637,402 | 1/1987 | Adelman | 128/746 |
| 4,752,906 | 6/1988 | Kleinfeld | 364/807 |
| 4,874,963 | 10/1989 | Alspector | 395/24 |
| 4,885,757 | 12/1989 | Provence | 395/24 |
| 4,926,064 | 5/1990 | Tapang | 395/24 |
| 4,933,871 | 6/1990 | DeSieno | 364/200 |
| 4,941,122 | 7/1990 | Weideman | 395/24 |
| 4,985,644 | 1/1991 | Okihara et al. | 365/189.05 |
| 5,092,343 | 3/1992 | Spitzer et al. | 364/413.05 |

OTHER PUBLICATIONS

Murry et al, "A Synchronous VLSI Neural Networks Using Pulse-stream Arithmetic," 1988 IEEE.
Murry et al, "Programmable Analog Pulse-firing Neural Networks", 1988 IEEE.

*Primary Examiner*—Allen R. MacDonald
*Assistant Examiner*—George Davis
*Attorney, Agent, or Firm*—Charles D. Brown; Randall M. Heald; Wanda Denson-Low

[57] ABSTRACT

A frequency-based neural network in which the state of a neuron is indicated by the frequency of an impulse stream emitted by the neuron uses an interconnectivity structure employing a frequency-modulation multiplexing scheme to weight and communicate the pulse stream from an emitting neuron to receiving neurons in another network level.

6 Claims, 7 Drawing Sheets

NEURAL NETWORK ARCHITECTURE

CROSS-REFERENCE TO RELATED PATENT APPLICATION

This patent application is related to material contained in U.S. patent application Ser. No. 611,213, filed Nov. 8, 1990, for "NEURAL PROCESSOR ELEMENT", which is assigned to the assignee of this application and incorporated herein by reference.

BACKGROUND OF THE INVENTION

The invention relates to neural network architecture, and more precisely, to the structure and operation of weighting interconnections in a frequency-based network of neural processors ("neurons").

Neural hardware structures currently fall into three main categories: analog, digital, and optical. Analog structures use voltage/current as the weighted variable between neurons and multiple interconnects for routing potential from the neurons of one layer to the neurons of the next layer in the system. Digital architectures use counting structures as the weight variable between neurons and multiple interconnection busses for routing values between neuron layers in the system. Optical structures use holographic refraction as the weight variable between neurons and multiple light interconnects for routing values between neuron layers.

A new frequency-based neural architecture independent of these technologies has been initially disclosed and described in U.S. patent application Ser. No. 611,213, filed Nov. 8, 1990. That application describes a neural processor element or neuron whose activity state corresponds to the frequency of a pulse stream emitted by the neuron. The neuron changes its state in response to excitory (E) signals and inhibitory (I) signals. These signals are pulse streams of opposite polarity, with an E pulse stream driving forward the action of the neuron, while an I pulse stream reverses or inhibits the forward action of the neuron.

The new frequency-based neural architecture is intended to be implemented in a silicon-based, integrated circuit technology such as CMOS. A significant challenge presented by this new architecture is to optimize the interconnect structures which conduct signals representing the synaptic weights of one level of an M×N neural network matrix to another level. In prior art neural technologies, the interconnect structures account for the majority of device area consumption and contribute significantly to process bottlenecking. A need is manifest for an interconnect architecture flexible and modular enough to accommodate evolving neural network system architectures and to allow scaling up to large-sized systems through assembly and interconnection of smaller sub-systems.

SUMMARY OF THE INVENTION

The objective of the invention is to provide an interconnect architecture for communicating weighted signals from one to another level of neurons in an M×N neural network array using frequency-based interneural signaling.

The structure of the neuron in the cross-referenced patent application is designed such that a summation of synaptic weights in the form of frequency-based signals is performed, instead of a summation of voltage/current typically used in analog neuron structures. The frequency-based neuron is driven by two signals, an excitory (E) and an inhibitory (I) signal. These signals are determined by synaptic weights, where the synaptic weights are represented as frequencies. Each frequency-based neuron in one level of an array is connected to provide a frequency-based pulse signal indicative of its state to none, one, some, or all of the neurons in the following level. Between the output of each neuron in a level and the input of each neuron in the next level which receives the output, a synaptic weight is applied. In the invention, a smaller weight is represented by a higher frequency and a larger weight by a lower frequency. Each receiving neuron responds to a pulse stream exhibiting a particular carrier frequency. The synaptic weight frequency for a receiving neuron is combined with the frequency of a state signal output by a transmitting neuron to shift the frequency of a carrier the signal provided to the receiving neuron. The shift in frequency of the signal from the carrier frequency to which the receiving neuron responds signifies the product of the synaptic weight and the state signal output by the transmitting neuron.

The invention is practiced in a neural network for connecting each of plurality of neurons in an M×N array and is directed to a communicating and weighting circuit for coupling the state output of a first neuron to a plurality of second neurons, the output of the first neuron including a pulse stream having a frequency which corresponds to an activity state of the first neuron. In the circuit;

a carrier stepper component generates a sequence of carrier signals, each carrier signal having a respective carrier frequency corresponding to a respective one of the plurality of second neurons;

a weight/input commutator generates a sequence of shifted carrier signals in response to the first neuron activity state output pulse stream, a sequence of frequency-based weighting signals, and the sequence of carrier signals, each shifted carrier signal having a shifted carrier frequency offset from a respective carrier frequency by an amount corresponding to the product of a weighting signal and the first neuron activity state output pulse stream; and for each of the plurality of second neurons, an input circuit connects the weight/input shifter to the second neuron and responds to a shifted carrier frequency by converting the shifted carrier frequency into either an excitory signal including a sequence of pulses having a first polarity or an inhibitory signal including a sequence of pulses having a second polarity.

The use of a single structure including a carrier stepper and a weight/input shifter between the first neuron in the first level of M×N neural network array and each neuron of the plurality of neurons in the next level reduces the proliferation of interneural interconnections, which achieves the stated objective.

Other distinct objectives and advantages of this invention will become evident when the following detailed description is read with reference to the drawings, described below.

DETAILED DESCRIPTION OF THE PREFERRED EMBODIMENTS

Figure 1:
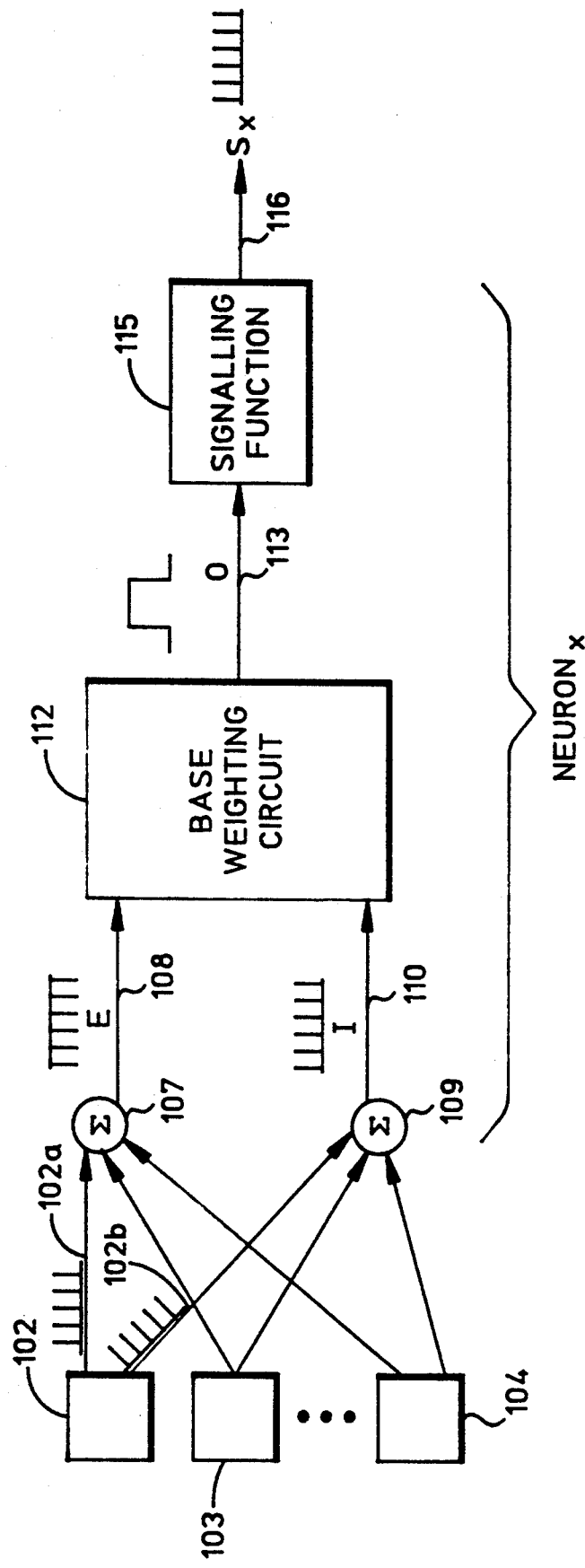
FIG. 1 is a block diagram illustrating the basic components of the new frequency-based neuron of the cross-referenced patent application.

Refer now to FIG. 1 for an understanding of the frequency-based neuron of the cross-referenced patent application. A plurality of signal sources 102, 103, and 104, are provided for illustration, each capable of emitting either one of two different kinds of pulse streams. Each pulse stream represents the product of a synaptic weight and the activity state signal of a neuron in a level of neurons preceding the one illustrated. Thus, the signal source 102 will produce either a first pulse stream on an output 102a or a second pulse stream on an output 102b. An output on the pulse stream 102a represents an excitory signal resulting from amplification of the activity state output signal from a preceding neuron by the synaptic weight of the connection between the neuron of FIG. 1 and a preceding neuron. Similarly, the oppositely-phased output on 102b represents attenuation of the strength of the previous neurons activity state signal by the synaptic weight.

As is known, in a neural network, synaptic weights represent the "learning" of the network and change over time as the network "learns". A synaptic weight essentially signifies the "strength" of the connection between a pair of neurons, and enhances the activity state signal output by the previous neuron if the connection is "strong". On the other hand, if the connection is "weak" the synaptic weight attenuates the activity state signal.

The neuron of FIG. 1 is frequency-based. The inputs which the neuron receives from neurons in the level preceding it are in the form of pulse streams whose frequencies deviate from a particular carrier frequency for the neuron by amounts which correspond to the product of a synaptic weight and an activity state output from a neuron in the preceding level.

The neuron of FIG. 1 will receive inputs from none, one, some, or all of the neurons in the level preceding it. Each input will be converted into either an excitory or inhibitory pulse stream. Excitory pulse streams are fed to the summation element 107, which provides on output 108 a pulse stream which is the sum of all excitory (E) inputs to the neuron. All inhibitory (I) inputs are summed by summation circuit 109, with the result being output as a pulse stream on signal line 110. The E and I signals are fed to a base weighting circuit 112.

The base weighting circuit 112 combines the E and I signals to generate an output signal (O) on signal line 113. The signal O is a pulse having a width corresponding to the combination of E and I signals received by the base weighting circuit 112. The signal O is provided to a signaling function circuit 115, which converts signal O to a pulse stream 116 whose repetition frequency directly correspond to the width of the output signal O. The repetition frequency of the output signal at 116 therefore represents the activity state of the neuron. In FIG. 1 the neuron is referred to as neuron x and its activity state output signal at 116 is denoted as $S_x$.

Figure 2:
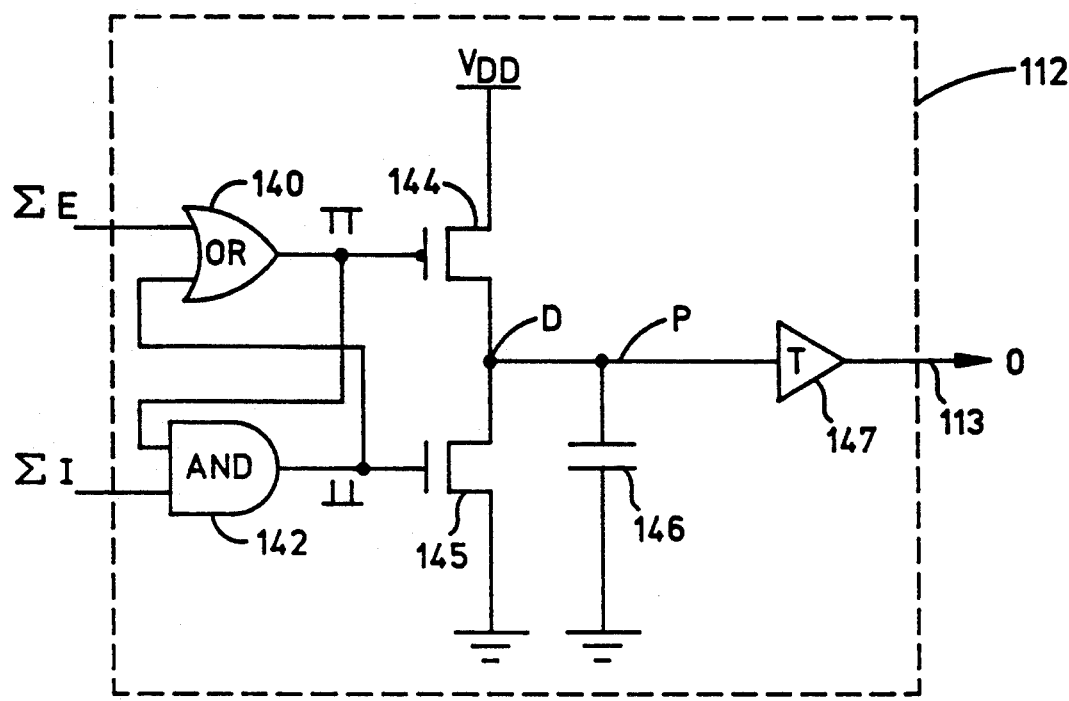
FIG. 2 is a logic diagram illustrating components of a base weighting circuit of FIG. 1.

For an understanding of the base weighting circuit 112 of FIG. 1, refer to FIG. 2. The base weighting circuit 112 includes an OR gate 140 and an AND gate 142 conventionally connected for lock-out operation. The outputs for the lock-out gates 140 and 142 are connected to the gate inputs of a pair of CMOS transistors 144 and 145 connected in a conventional compound, complementary serial fashion. In this regard, a P-channel transistor 144 has a drain connected to a voltage source $V_{DD}$ and its source connected to the source of an N-channel transistor 145, whose drain is connected to ground. The common connection, between the transistors 144 and 145 provides the output O of the complementary pair.

In the base weighting circuit 112, the output O of the complementary transistor pair is provided to one plate of a capacitor 146, and from that plate to the input of a pulse generator 147. The generator 147 is a thresholding (T) device which produces a level output that is changed in response to a signal on the device's input. The output of the generator 147 is provided on signal line 113 as the output O of the base weighting circuit 112.

Figure 3:
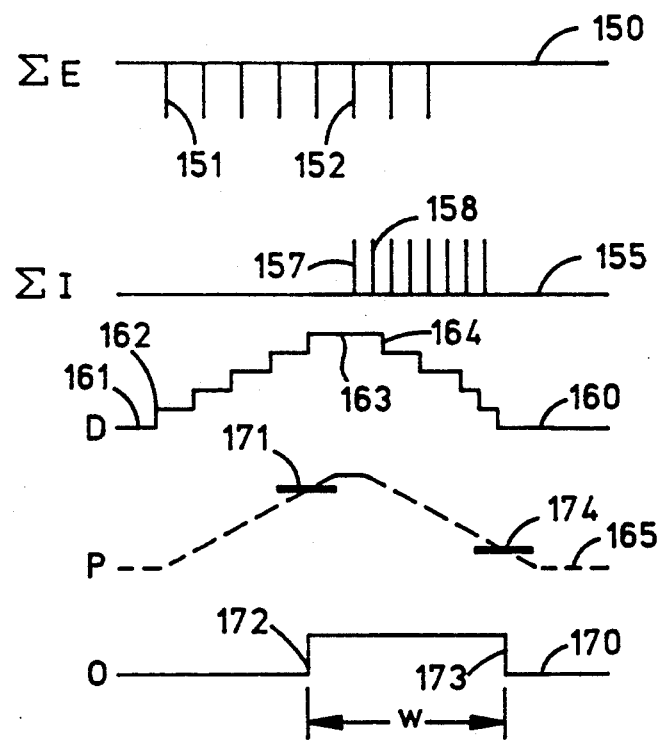
FIG. 3 is a set of waveforms illustrating the operation of the base weighting circuit of FIG. 2.

Operation of the base weighting circuit of FIG. 2 can be understood with reference to the waveforms of FIG. 3. As stated above, each individual synaptically weighted neuron output received by the neuron of FIG. 1 consists of a stream of pulses whose frequency is a weighted function of the state of the preceding generating neuron. Each of the signal generators 102, 103, and 104 in FIG. 1 provides a stream either to the E summation circuit 107 or the I summation circuit 109. The results of the summation circuits 107 and 109 are respective impulse sequences whose frequencies are a function of the frequencies of all E or I pulse streams combined in the summation circuits. The output of the summation circuit 107, which is provided on signal line 108 to the base weighting circuit 112, is indicated by reference 150 in FIG. 3, the I pulse stream by reference 155.

As FIG. 3 indicates, the summation circuits 107 and 109 also provide the E and I pulse streams 150 and 155 with respective polarities. In this regard, the E pulse stream is the sequence of negative-going impulses 151 and 152, with the quiescent level of the stream being a relatively positive voltage level. The I pulse stream 155 has an inverse polarity, with a negative quiescent level and positive-going impulses 157, 158.

The operation of the base weighting circuit in response to the E and I pulse streams 150 and 155 is the provision of a weighting signal with characteristics that convey a weight value that is used to modulate the output of the neuron. The impulse streams 150 and 155 are initially gated through the lock-out gates 140 and 142. When the two streams are quiescent, the output of the OR gate 140 is active in response to the positive level of the waveform 150, while the AND gate is deactivated in response to the negative logic level of waveform 155. The quiescent outputs of the lock-out gates 140 and 142 are fed to the P and N-channel transistors 144 and 145, respectively, which keeps the transistors turned off. Assuming the capacitor 146 is fully discharged at this point, the charge signal provided by the complementary pair of transistors taken at point D in FIG. 2 is illustrated by waveform 160. The charge waveform on the capacitor is represented at point P by waveform 165. In the initial quiescent state, the charging waveform D is at level 161.

Assume now that the time history of waveforms 150 and 155 recedes to the left so that impulses 151 and 157 are, respectively, the first E and I impulses provided to the lock-out pair 140, 142. When the impulse 151 arrives, the output of the OR gate 140 is deactivated, turning on the P-channel transistor 144 and stepping up the charge provided to the capacitor 146 as indicated by the step increase 162 and the waveform 160. The succession of impulses in the waveform 150 continue to step up the charge on the capacitor 146, until the first positive-going pulse 157 in the inhibitory impulse stream is encountered. As FIG. 3 shows, the impulses 152 and 157 arrive simultaneously at the lock-out gate, and neutralize one another, with the effect illustrated in the flat portion 163 of the charging waveform D. Next, the I pulse 158 activates the output of the AND gate 142, turning on the N-channel transistor 145 and providing a discharge step 164 in the waveform D. With the arrangement of impulses illustrated in FIG. 3, the capacitor 146 is eventually discharged, as illustrated by the waveform 160.

The actual charging waveform 165 of the capacitor 146 is routed to the generator 147. Its operation causes the generator 147 to recognize a first threshold level 171 and a second threshold level 174. The resultant output O of the generator 147 is illustrated by the waveform 170 Generator 147 is activated at 172 by the level 171 of and the charging waveform 165, and is deactivated at 173 by transition of the charge waveform 165 through the second threshold 174.

The implication of FIG. 3 is that the base weighting circuit 112 provides a synaptic weighting signal O. The weighting significance of the output signal O is in the width, W, of the pulse produced by the generator 147. As will be appreciated from the explanation above with reference to FIGS. 2 and 3, the weighting significance of this pulse results from the combination of the E and I impulse streams. As explained above, the neural intelligence communicated by those impulse streams lies in their polarity and frequency.

Returning to FIG. 1, the complete structure of the neuron includes a signalling function circuit 115 which provides a neural output signal $S_x$ having imposed on it certain neural characteristics. Preferably, these characteristics would be in the form of frequency modulation of an impulse stream which is forwarded to the next level of neurons in the network by way of output 116. For this purpose, the signaling function 115 can, for example, be embodied in a keyed oscillator providing an impulse stream having a frequency determined by the width of the signal O output by the base weighting circuit 112.

The base weighting circuit of FIG. 1 illustrates, in principle, how the synaptic weighting function of a neuron is generated in response to E and I inputs from other neurons in a neural network. In this regard, the interneuronal signals are frequency-based (which can be viewed as functions of time). The neuron decides to fire, sending its own frequency signal in the form of train of impulses to other neurons, or not to fire, depending upon the attenuated frequency sum of the input signals exceeds a prescribed threshold (which can be viewed as a function of space). The rate of firing of the neuron (its spike frequency) as a function of the time-based sum of inputs (temporal) and the threshold value (spatial) can be considered as a multi-dimensional (spatio-temporal) transfer function or response of the neuron.

Best mode considerations regarding the capacitor 146 of the neuron of FIG. 2 recognize that when the capacitor 146 receives a constant voltage, it will be charged exponentially. Since the transistors 144 and 145 that are driving this capacitor 146 may be driven into the cutoff or saturation regions of operation, a constant voltage is, in effect, delivered to the capacitor 146. The exponential response of the capacitor 146 to the constant voltage affects the requisite threshold function of the waveform generator 147. When a number of E impulses are received, the charge added to the capacitor 146 from the latest impulse will be less than the charge added by the previous impulse. When an I impulse is next received, it will reduce the charge on capacitor 146 by a greater amount than the charge added by the preceding E impulse. Ideally, the capacitor 146 should be charged linearly, which would ensure equal charge contribution from both E and I impulses and would lengthen the dynamic operational bounds of the base weighting circuit 112.

To correct the problem of exponential charging of the capacitor 146, the charging voltage may be varied depending on the level of charge. This requires operating the transistors 144 and 145 in their linear regions. For each transistor, its gate voltage must be set at an intermediate value between $V_{DD}$ and $V_{SS}$ to achieve a linear bias function. Preferably, the firing of the neuron illustrated in FIG. 1 is bound by the threshold values which determine when the output signal O transitions. The bounding enables synaptic weighting and recombination. Many different thresholding mechanisms are available, including structures which provide ramp, hyperbolic tangent, and step functions. Any of these waveforms can characterize the threshold function implemented by the generator 147 in FIG. 2.

Conversion of the linearized, bounded output P of the capacitor 146 in FIG. 2 into a pulse waveform is described in the cross-referenced patent application. Essentially, the thresholding component 147 outputs a linearized, bounded voltage level signal O to the signaling function of circuit 115. This circuit 115 is described as a ring or voltage controlled oscillator which produces a square wave whose frequency is proportional to the level of the voltage output O by the thresholding element 147. The square wave is converted into a pulse stream by a D flip-flop connected conventionally as a wave-shaping device. As a wave-shaper the flip-flop is clocked by the square wave, while its D input is tied to a positive voltage. The reset (R) port of the flip-flop is connected to its inverting O output, which results in a pulse at the noninverting Q output for each rising edge of the square wave produced by the oscillator 115. The result is a pulse stream having the frequency of the square wave. Since the pulse stream's frequency is directly determined by the weighting voltage output O, the frequency output by the neuron of FIG. 1 is said to be "weighted" by the frequencies its inputs.

Figure 4:
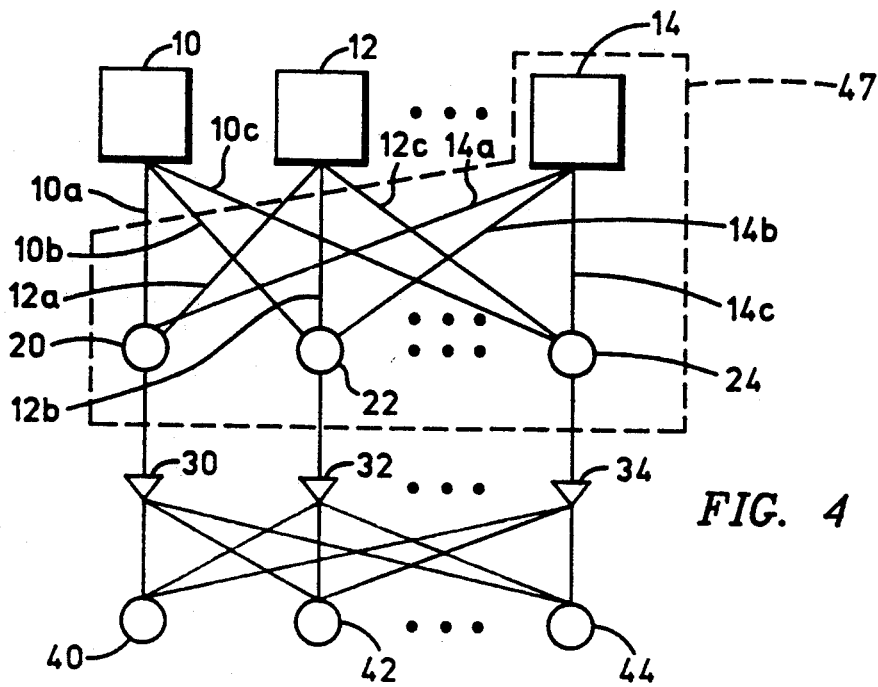
FIG. 4 is a block diagram illustrating the input and output connections of a level of neurons in a neural network.

FIG. 4 illustrates two levels of M×N array of frequency-based neurons. Each neuron in the array responds to frequency-based E and I inputs derived from output pulse streams whose frequencies correspond to the activity states of the preceding neurons.

A portion of the M×N array is illustrated by input elements 10, 12, and 14, a level of neurons 20, 22, and 24 having outputs 30, 32, and 34 which provide inputs to a next level of neurons 40, 42, 44. The input elements 10, 12, and 14 can represent the output terminals of a level of neurons preceding the level including neurons 20, 22, and 24. Alternatively, the elements 10, 12, and 14 can represent external inputs to a first level of neurons in a M×N array.

In FIG. 4, each signal element 10, 12, and 14 has an output connection to each neuron in the next level of neurons. Thus, for example, the element 10 has connections 10a, 10b, and 10c to the neurons 20, 22, and 24. FIG. 4, therefore, suggests that each neuron in the level including neurons 20, 22, and 24 receives an input from each neuron of the preceding level; in fact, this is a maximal connection and each neuron can receive inputs from none, one, some, or all of the neurons of the preceding level, as the application demands. Similarly, FIG. 4 suggests that the output of each neuron in the level including neurons 20, 22, and 24 is connected to the input of each neuron in the following level. In fact, fewer than all of these connections may be required by a particular application.

As those skilled in the art will realize, each individual connection between the output of a neuron in one level and the input of a neuron to which it is connected in the next level includes an interneural weight. Thus, between the element 14 and the neuron 24, the connection 14c must provide a weighting function whose magnitude will correspond to the relative strength of the connection between the neuron 24 and the preceding neuron whose output is provided on 14c. It will be appreciated that provision of individual weighting circuits in each interneural connection in the network represented by the network portion of FIG. 4 can consume an immense amount of active area in an integrated circuit including the neural array. A significant advantage in the invention is to provide a single circuit for weighting the interconnections between the output of each neuron, and all of the neurons in the next level to which it provides its output. This is illustrated in FIG. 5.

Figure 5:
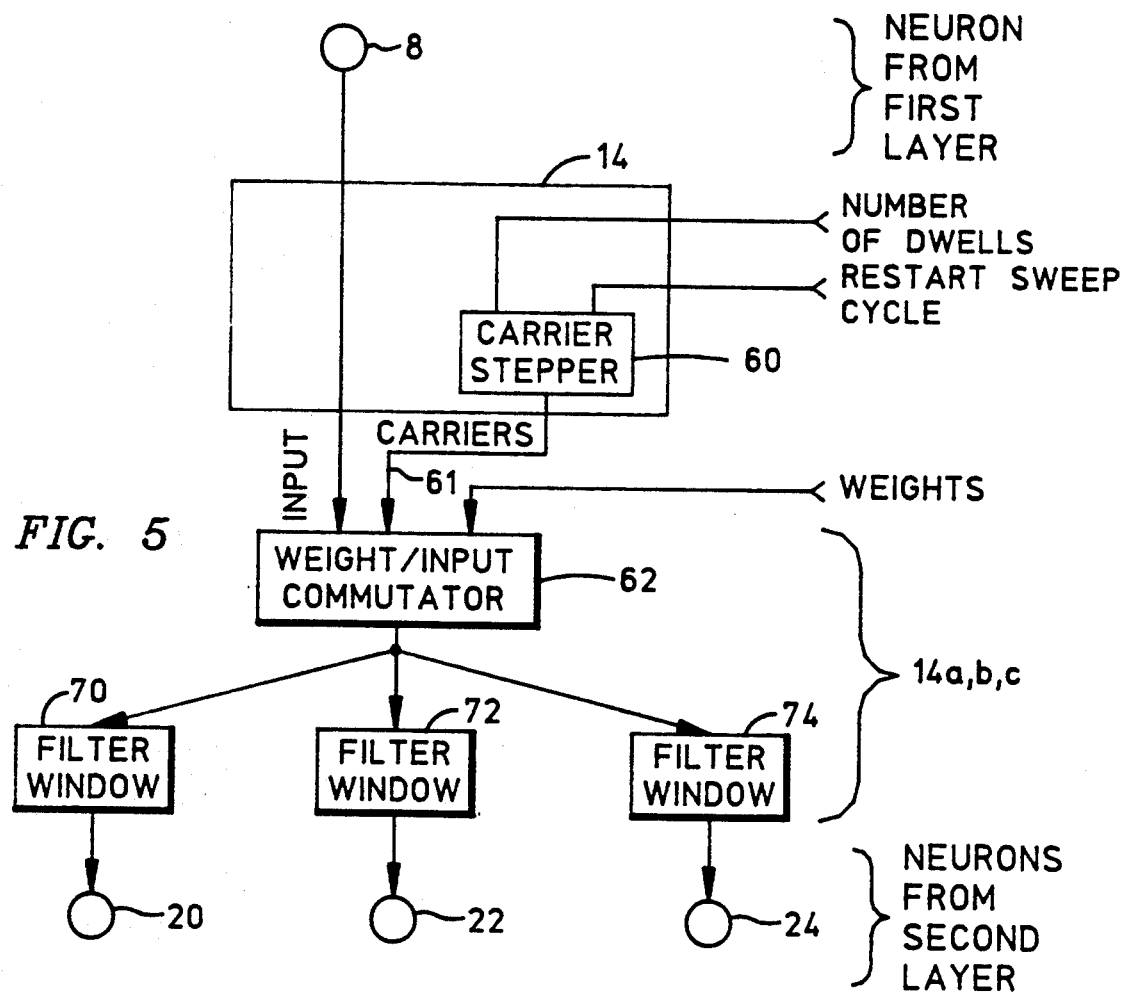
FIG. 5 is a block diagram illustrating in greater detail the connections between the output of a neuron in the first level and the inputs of a plurality of neurons in a following level of a neural network.

FIG. 5 corresponds to the portion of M×N array which is indicated by reference numeral 47 in FIG. 4. In FIG. 5, the element 14 is assumed to connect the output of neuron 8 to the level of neurons including the neurons 20, 22, and 24. In this regard, when viewing the next level of neurons, the activity state output signal produced by the preceding neuron 8 is considered as an input.

The invention is based on the assignment, for input purposes, of a particular carrier frequency to each neuron in the level of neurons receiving the input from the level including neuron 8. Thus, the neuron 24 will have a carrier frequency which differs from the carrier frequencies for the neurons 20 and 22, and so on. The input signal representing the level of activity of the neuron 8 is an impulse stream whose frequency signifies the level of activity of the neuron 8. For each of the neurons in the receiving level, this input must be combined with another impulse stream whose frequency signifies an interneural weight between the receiving neuron and the neuron 8. The weighting and input streams are combined and applied to the impulse stream having the carrier frequency identifying the neuron for which the weight is provided; this produces a weighted input for the receiving neuron which is in the form of an impulse stream whose frequency is offset from the carrier frequency by an amount corresponding to the product of the weight and input values.

The invention operates by synchronously commutating carrier frequencies and weights. As is typical for this process, the mechanism of the invention commutates to a frequency carrier for a particular neuron, and simultaneously commutates to the weight frequency obtaining between that neuron and the neuron 8, and dwells at the carrier and the weight frequencies for a period of time to permit the weight and input signals to be combined and applied to the carrier. So modulated, the carrier is communicated to the receiving level of neurons including 20, 22, and 24 where the neuron to which it corresponds receives it through a filter window circuit. The filter window circuit obtains the weighted input from the carrier, decides whether it is an E or an I input, and provides the decided-upon input to the neuron. The process then commutates to the next carrier/weight combination and repeats. When the carrier frequency for the last neuron in the receiving level is reached, the commutation cycle begins again.

In FIG. 5, a carrier stepper circuit 60 receives two signals: NUMBER OF DWELLS ("DWELLS") and RESTART SWEEP CYCLE, in response to which it produces on signal line 61 a signal sequence labeled CARRIERS. The activity state output signal from the neuron 8 is fed as an input, together with the CARRIERS signal, sequence and a WEIGHTS signal to a weight/input commutator 62. The weight/input commutator 62 produces, at or near the correct carrier frequencies, weighted inputs for the neurons in the receiving level including the neurons 20, 22, and 24. These weighted input signals are connected at 64. The neurons 20, 22, and 24 are connected in common to 64 through respective filter windows 70, 72, and 74.

The weight/input commutator 62, the common connection 64, and the filter windows 70, 72, and 74 correspond to the individual signal paths 14a, 14b, and 14c, in FIG. 4. Thus, a single circuit suffices to provide the interneural connections between a neuron in a first level of neurons and all neurons in the succeeding level to which the neuron is connected.

Figure 6:
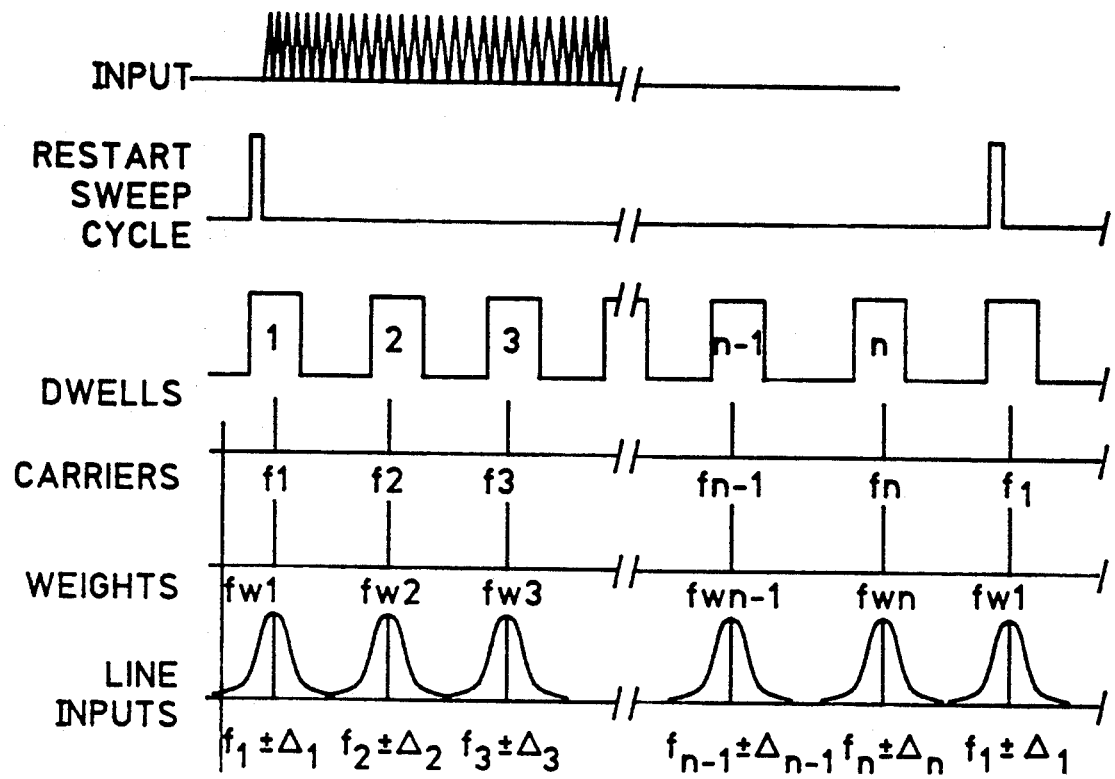
FIG. 6 is a set of waveform diagrams illustrating timing relationships between certain signals in FIG. 5.

FIG. 6 illustrates the operation of the circuit of FIG. 5. The neuron 8 produces an activity state output signal which is an impulse stream having a frequency indicative of the activity state of the neuron 8. The output signal is illustrated by the INPUT signal line of FIG. 6. The RESTART SWEEP CYCLE is a pulse stream having a relatively low duty cycle. The NUMBER OF DWELLS signal (DWELLS in FIG. 6) is a square wave which oscillates in synchronism with the RESTART SWEEP CYCLE signal. During the positive level of the DWELLS signal, the carrier stepper circuit 60 produces a carrier frequency corresponding to one of the neurons in the receiving level. Between each occurrence of the RESTART SWEEP CYCLE, the carrier stepper circuit 60 steps up the carrier frequency during each positive level of the DWELLS signal. Thus, in FIG. 6, the CARRIERS signal steps up in frequency from frequency $f_1$ through $f_n$. The CARRIERS plot is shown in the frequency domain. During each positive level of the DWELLS signal, the carrier stepper circuit 60 produces an impulse stream at a carrier frequency. In synchronism with the DWELLS signal the WEIGHTS signals are provided as shown in FIG. 6. Concurrently with the frequency carrier for a particular neuron, the weight signal assumes a weight frequency $f_w$ for the same neuron. Each weight signal includes an impulse stream having a frequency corresponding to the weight obtaining between the neuron and the receiving level neuron whose carrier frequency is currently being produced. Thus, when the carrier frequency $f_1$ is produced in the first dwell cycle, the weight signal, $f_{w1}$, for the corresponding neuron is also produced.

The weight/input commutator 62 combines the magnitudes of the input and weight signals during each dwell cycle to produce a signal that is then used to offset the current carrier frequency by a corresponding amount. The offset ("shifted") carrier frequency is connected at 64 in FIG. 5 and represents the weighted input for the neuron corresponding to the receiving level carrier frequency which has been offset. Each LINE INPUT plot in FIG. 6 represents the offsetting of a respective carrier frequency by a respective weight. For example, in the second dwell cycle, the corresponding gaussian plot on the LINE INPUTS axis represents the range and pattern of frequencies (power spectrum) that results by shifting the carrier frequency $f_2$ in response to a combination of the input signal and the WEIGHTS frequency signal $f_{w2}$.

The LINE INPUTS signals are connected from the weight/input commutator 62 to the receiving level of neurons at 64. The LINE INPUTS are connected in common to the filter windows 70, 72, and 74. Each filter window exhibits a quasi-gaussian response as illustrated in the LINE INPUT of FIG. 7. In this case, the LINE INPUT signal is a pulse stream exhibiting a frequency which is shifted from a carrier frequency. Assume that the carrier frequency is $f_c$. The filter window for the receiving neuron corresponding to the carrier frequency $f_c$ receives the shifted carrier frequency signal. If the carrier offset is in the left-hand half of the quasi-gaussian response curve, the filter window decodes the line input as an excitory (E) signal and produces a pulse stream of appropriate polarity. This pulse stream is provided to the E summation circuit for the receiving neuron. On the other hand, if the carrier frequency offset is in the right-hand half of the quasi-gaussian response, the filter window decodes the LINE INPUT as an inhibitory (I) signal and produces a pulse stream with the appropriate polarity for presentation to the I summation circuit of the receiving neuron.

Figure 8:
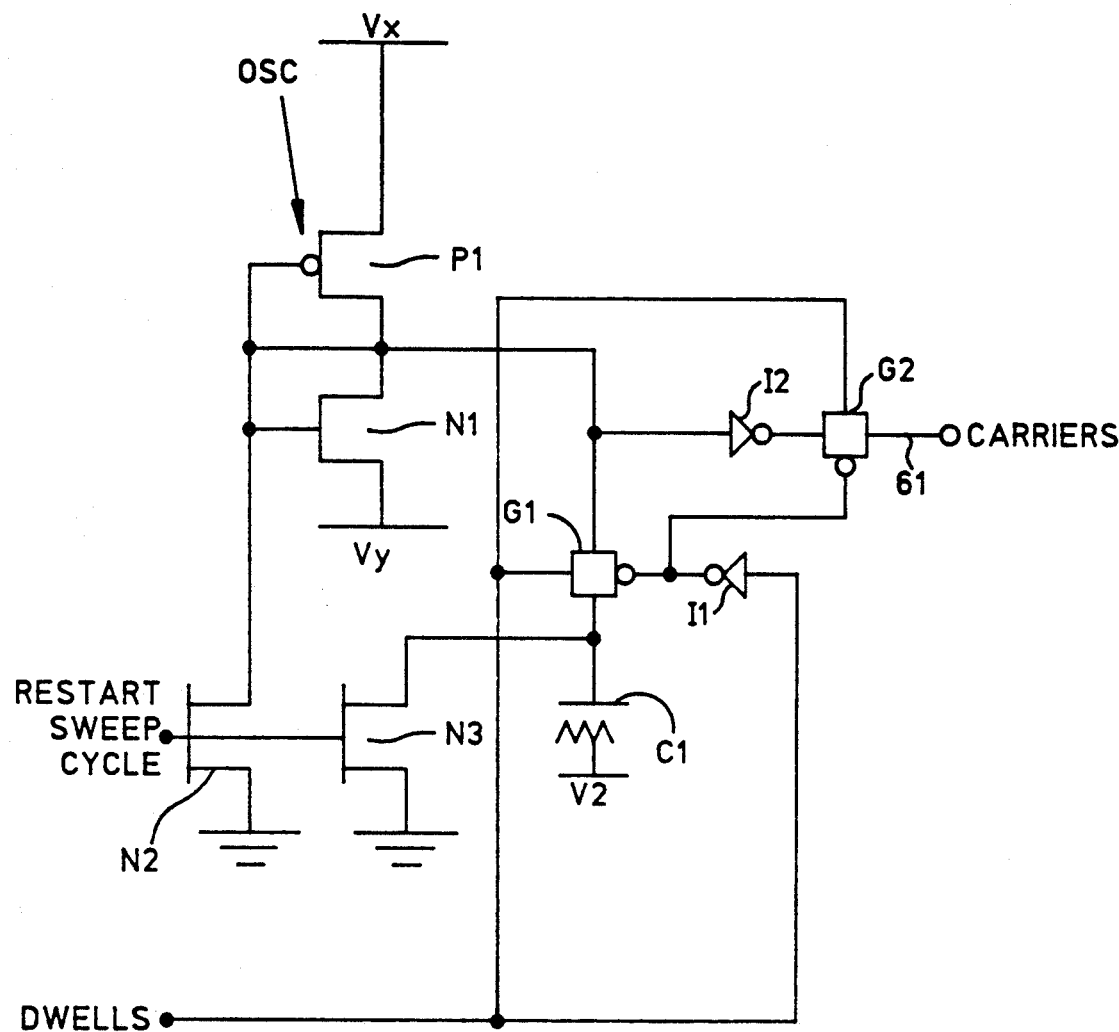
FIG. 8 illustrates a carrier stepper component of the block diagram in FIG. 5.
Figure 9:
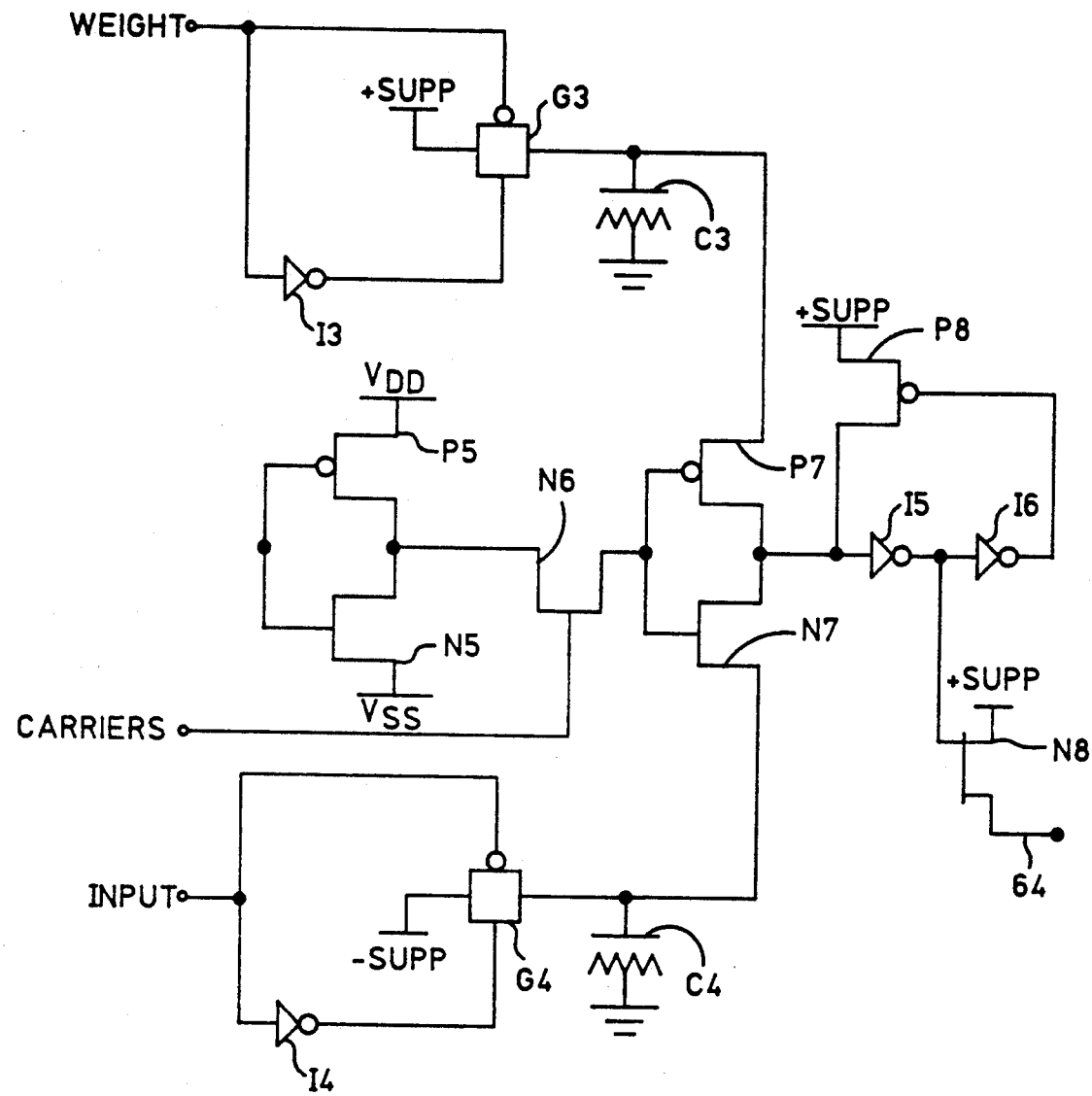
FIG. 9 illustrates a weight/input commutator element in the block diagram of FIG. 5.
Figure 10:
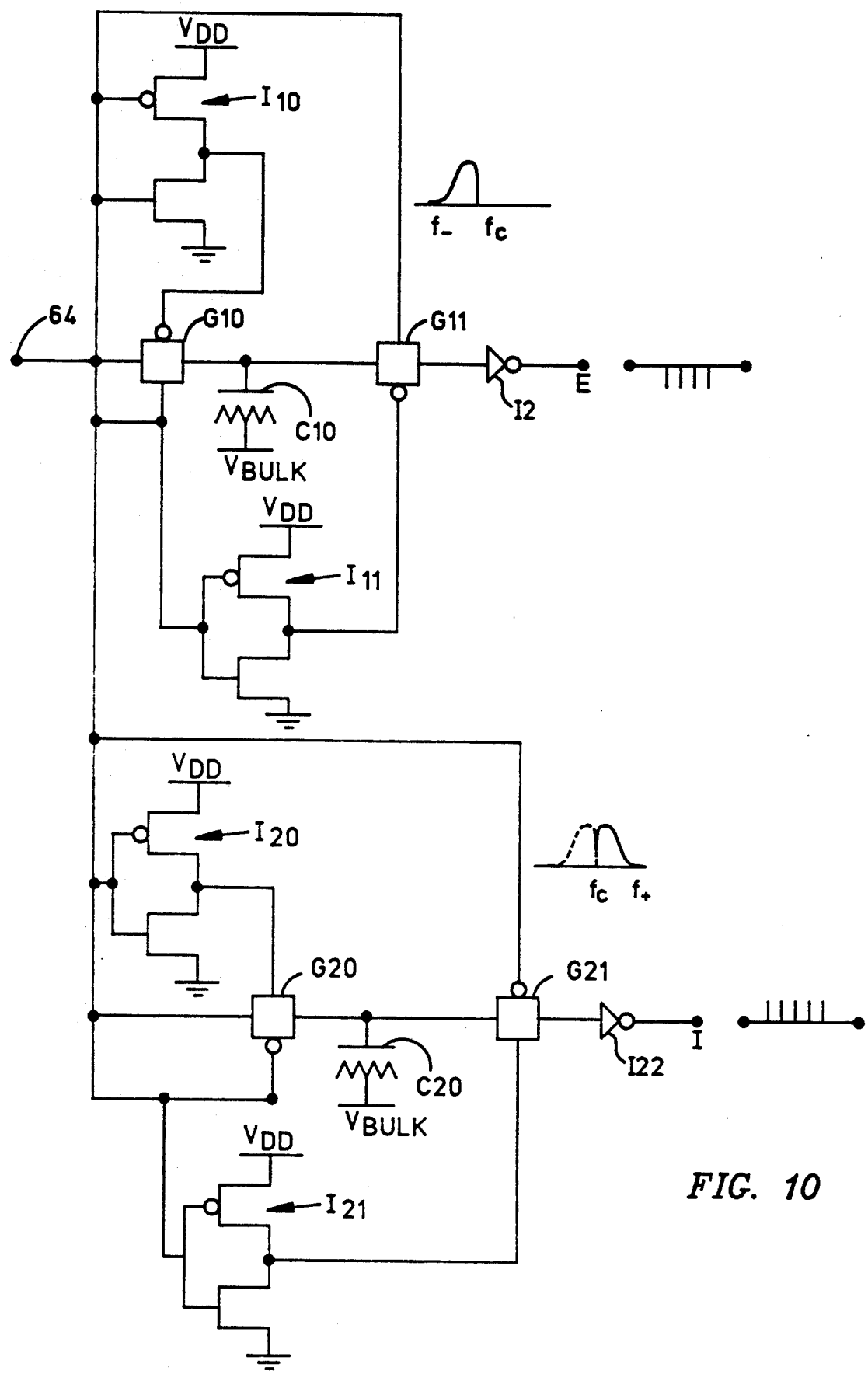
FIG. 10 illustrates a filter window element in the block diagram of FIG. 5.

FIGS. 8-10 illustrate how the carrier stepper, weight/input commutator, and filter window circuits of FIG. 5 are implemented in the best mode of the invention in CMOS integrated circuit technology. In FIG. 8, the carrier stepper includes a complementary transistor pair P1/N1 connected as an oscillator. These transistors are connected between control voltages $V_x$ and $V_y$ which control the range of frequencies at which the transistor pair oscillates. The RESTART SWEEP CYCLE signal is applied to the oscillator through an N-channel transistor N2. When the RESTART SWEEP CYCLE pulse occurs, the gate charges on the transistor pair are equalized with the charge on a common connection between the transistors by grounding through N2, and the oscillator stops operating. When the RESTART SWEEP CYCLE signal is inactive, the transistor N2 is turned off, and the oscillator begins to operate, accelerating in frequency. It is noted that the oscillator produces a stream of impulses which increase in frequency toward the natural frequency of the oscillator.

Continuing with the description of the carrier stepper circuit of FIG. 8, the RESTART SWEEP CYCLE signal is also applied through an N-channel transistor N3 to an integrating capacitor C1 capacitor which is connected between the control voltage $V_z$ and the input port of a CMOS transmission gate G1. The integrating capacitor includes two parasitic junction capacitances: one from a CMOS transistor source junction and the other from a CMOS transistor drain junction. Reverse junction bias on the CMOS device results in an integrating capacitance that selectively loads an increased frequency input signal by increasing the current drain. This capacitance is applied to the oscillator during each positive level of the DWELLS signal, through the gate G1. The DWELLS signal is supplied to the positive control port of the gate G1 and is inverted through the CMOS inverter I1 and applied to the negative control port of the gate. Thus, when DWELLS assumes a positive level, the gate G1 turns on, loading the P1/N1 oscillator with the voltage on C1. This inhibits the acceleration of the oscillator, making it pause at the frequency to which it had accelerated since the last positive level of the DWELLS signal.

The CMOS transmission gate G2 is switched in phase with the gate G1 by the DWELLS signal. The output of the oscillator is buffered through a CMOS inverter I2 to the input port of the gate G2. When the DWELLS signal has a positive level, the gate G2 is open and the output of the oscillator is buffered through I2 and G2 to the output 61 of the carrier stepper.

In operation, the carrier stepper of FIG. 8 receives a RESTART SWEEP CYCLE, which momentarily stops the operation of the P1/N1 by discharging the gate capacitances through the transistor N2. At the same time capacitor C1 is discharged through the transistor N3. When the RESTART SWEEP CYCLE signal is inactive, the oscillator begins to accelerate toward its natural frequency. At each positive level of the DWELLS signal following the RESTART SWEEP CYCLE pulse, the transmission gate G1 is activated, connecting the voltage $V_z$ to the oscillator through the capacitor C1. When the voltage $V_z$ is thusly connected, the oscillator stops accelerating and pauses at a particular frequency. Each pause of the oscillator corresponds to a carrier frequency. At each succeeding cycle of the DWELLS signal, the carrier signal frequency has increased. The gate G2 is operated in synchronism with the gate G1, so that each time the oscillator dwells at a carrier frequency, the carrier frequency is coupled to the output of the carrier stepper circuit through the buffer I2 and the gate G2.

FIG. 9 illustrates the weight/input commutator. In the commutator, the weight signals are connected at WEIGHTS to control a CMOS transmission gate G3. The signal is connected directly to the inverting control port of the gate G3 and through CMOS inverter I3 to the positive control port of the gate. The input to the gate G3 is connected to a positive supply (+SUPP) and the output is connected to one lead of an integrating capacitor C3. The activity state output signal of a neuron in the transmitting level is connected at the INPUT connection to the inverting control port of a CMOS transmission gate G4. The neuron INPUT is inverted through the CMOS inverter I4 and connected to the noninverting control port of the gate G4. The input of the gate G4 is connected to a negative supply (−SUPP), and the output of the gate G4 to one side of an integrating capacitor C4. A high-speed oscillator including a complementary CMOS transistor pair P5 and N5 is connected at the source of an N-channel transistor N6. The output of the carrier stepper circuit (FIG. 8) is connected through CARRIERS to the gate of transistor N6, which is drained through a complementary CMOS transistor pair P7 and N7.

As thus far described, the weight/input commutator operates much as an exponential modulator. In this regard, the oscillator consisting of the transistors P5 and N5 is designed to oscillate at a frequency substantially above the highest carrier frequency. Thus, as a carrier frequency impulse stream is applied to the gate of the transistor N6, the transistor N6 mixes the carrier steam with the high frequency impulse stream generated by the P5/N5 oscillator. This translates the carrier frequencies and extends their effective dynamic range. The carrier frequency is modulated by the voltage across the transistor pair P7/N7.

The voltage across the transistor pair P7/N7 is a function of the difference between the charges on the integrating capacitor C3 and the integrating capacitor C4. The charge on the integrating capacitor C3 varies directly with the frequency of the weighting signal or the selected carrier. The charge on the integrating capacitor C4 varies directly with the frequency of the input signal, representing the activity state of the neuron in the transmitting level. The weighting signal is set to a frequency corresponding to the weight given the connection between the transmitting neuron and the receiving neuron represented by the selected carrier frequency input to the transistor N6. A relatively greater weight is represented by a relatively lower frequency of the weighting signal. A lower frequency produces a lower charge on the integrating capacitor C3. A higher frequency, signifying a higher weight, produces a higher charge on the capacitor C3. The charge on the integrating capacitor C4 is similarly by the impulse frequency of the input A8 state signal from the preceding neuron.

At some potential difference across the exponential modulator P7/N7, the translated carrier signal will be output with no shift in frequency. As the potential difference increases, the carrier output frequency will be offset in a positive direction, resulting in a shifted carrier signal having a frequency higher than the nominal carrier frequency. As the potential difference reduces from the midlevel, the shifted carrier signal output by the exponential modulator will have a shifted carrier frequency which is less than the nominal carrier frequency input to the transistor N6.

The output of the exponential modulator P7/N7 is provided to a normalizing circuit consisting of the transistors P8, N8, and the inverters I5, I6. This circuit formats the output of the modulator P7/N7 and routes the shifted carrier signal through the N-channel transistor N8 to the line connection 64. This takes advantage of the mobility of carriers in the N-channel device, which is relatively higher than that of the carriers in the P-channel device P8.

Figure 7:
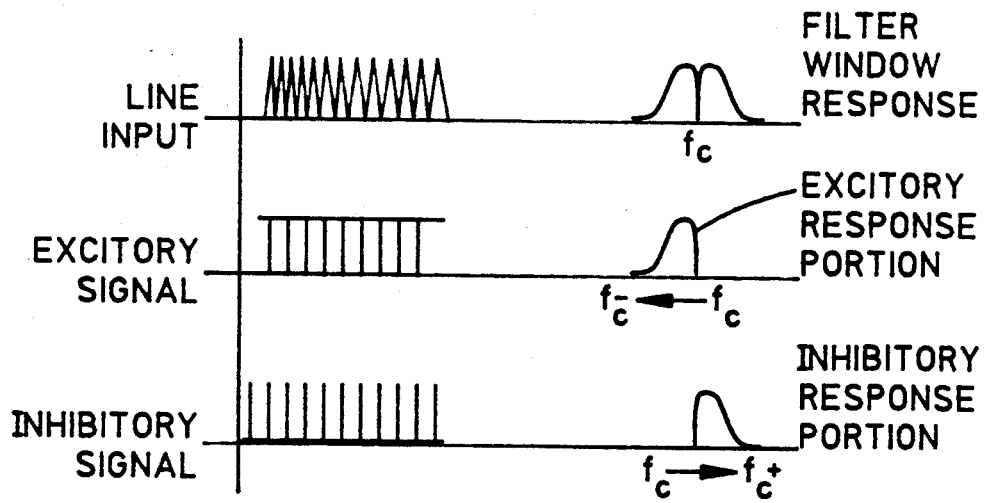
FIG. 7 is a set of waveform diagrams illustrating the relationship between the synaptic weighted output of one neuron and transformation of that signal into excitory or inhibitory inputs to a neuron.

FIG. 10 illustrates the structure of a filter window having two sections, each of which passes one half of a quasi-gaussian function such as that shown in FIG. 7 on the LINE INPUT plot. The upper section (FIG. 10) passes frequencies from the carrier frequency $f_c$ down to some lower frequency $f_-$ while the lower section FIG. 10 transfers frequencies to the higher half of the quasi-gaussian distribution from $f_c$ to $f_+$. Thus, the upper section, consisting of two inverters, I10 and I11, two transmission gates, G10 and G11, an integrating capacitor, C10, and an output buffer, I12, passes shifted carrier frequencies which correspond to a weighting signal that decreases the nominal carrier frequency associated with the connection with the previous neuron. This corresponds to a higher weight, and the shifted carrier is converted to an excitory (E) input for the receiving neuron. The lower section, consisting of CMOS inverters I20 and I21, CMOS transmission gates G20 and G21, integrating capacitor C20, and CMOS buffer I22 passes shifted carrier frequencies which equal or exceed the nominal carrier frequency, converting signals in the upper half of quasi-Gaussian distribution (FIG. 7) into inhibitory (I) signals inverted in phase relative to the E signals.

The respective pass bands of the filter window sections in FIG. 10 are realized in a CMOS implementation by selective tailoring of the dimensions of the transistors which make up the CMOS inverters I10, I11, I20 and I21. In this regard, the dimensions of the inverters I20 and I21 are selectively designed to be smaller than the corresponding dimensions of the transistors making up the inverters I10 and I11. As those skilled in the art of CMOS design and fabrication will realize, the manufacturing technology for CMOS circuits has advanced to a state where the components making up the respective sections of the filter window in FIG. 10 can be precisely tailored to provide very well defined response characteristics which can correspond to the quasi-gaussian representations in FIG. 10 for a wide range of carrier frequencies. Therefore, it is well within the capability of CMOS circuit designers to selective fabricate filter windows so as to provide for each neuron in a layer a well-defined quasi-gaussian pass band centered on the neuron's nominal carrier frequency.

Although this invention has been shown and described with respect to a specific embodiment, it should be understood by those skilled in the art that various changes, omissions, and additions to the form and details of the invention may be made without departing from the spirit and scope of the invention, which is defined in the following claims.

I claim:

1. In a neural network for connecting a plurality of neurons in an array, a communication and weighting circuit for coupling an activity state output of a first neuron to a plurality of second neurons, the activity state output of a neuron including an impulse stream having a frequency which corresponds to an activity state of the neuron, the circuit comprising:

carrier stepper means for generating a sequence of carrier signals, each carrier signal of said sequence of carrier signals being an impulse stream having a respective carrier frequency which corresponds to a respective second neuron of the plurality of second neurons;

commutator means responsive to an activity state output impulse stream of said first neuron, to said sequence of carrier signals, and to a sequence of weight signals, each weight signal of said sequence of weight signals being an impulse stream having a frequency corresponding to a weight between said first neuron and a respective second neuron, for generating a sequence of shifted carrier signals, each shifted carrier signal of said sequence of shifted carrier signals having a shifted carrier frequency which is offset from a respective carrier frequency by an amount corresponding to a product of a weight signal and the frequency of said activity state output impulse stream of said first neuron;

at each second neuron of the plurality of second neurons, an input means connected to said commutator means, and responsive to a respective carrier frequency which corresponds to said second neuron, said input means for converting a shifted carrier signal which is offset from said respective carrier frequency into either an excitory signal including a sequence of pulses having a first polarity or an inhibitory signal including a sequence of pulses having a second polarity, said second polarity being substantially the inverse of said first polarity; and, said input means including bandpass filter means connected to said second neuron, said bandpass filter means being tuned to pass only signals in a frequency band substantially centered on the respective carrier frequency which corresponds to said second neuron.

2. A circuit according to claim 1, said carrier stepper means comprising:

carrier increment means for incrementing said carrier frequency;

carrier dwell means connected to said carrier increment means, for preventing said carrier increment means from incrementing said carrier frequency for a finite settling time; and carrier sequence restart means connected to said carrier increment means, for resetting said carrier frequency to an initial value.

3. In a neural network interconnecting a plurality of neurons where an activity state output signal of a transmitting neuron includes an impulse stream having an activity frequency representing an activity state of said transmitting neuron, a communications circuit for coupling said activity state output signal of said transmitting neuron to a plurality of receiving neurons, in which relative weights are represented by weight signals, each weight signal having a weight frequency corresponding to a weight between the transmitting neuron and a respective receiving neuron, the weight signals being included in a sequence of weight signals, said circuit comprising:

carrier stepper means for generating a sequence of carrier signals, each said carrier signal including an impulse stream having a respective carrier frequency corresponding to a respective receiving neuron, said sequence of carrier signals being synchronous with said sequence of weight signals such that a respective carrier signal corresponding to a respective receiving neuron occurs substantially concurrently with a weight signal having a weight frequency corresponding to a weight between said transmitting neuron and said respective receiving neuron;

commutator means connected to said transmitting neuron and to said carrier stepper means and including means for receiving said sequence of weight signals, said commutator means for generating a sequence of shifted carrier signals in response to said carrier signals, said weight signals and said activity state output signal, each said shifted carrier signal corresponding to a respective receiving neuron and including a modulation frequency that differs from the respective carrier corresponding to said respective receiving neuron frequency by an amount representing a product of the interneural weight between said transmitting neuron and said respective receiving neuron and said activity state;

filter window means connected to said commutator means for selecting a respective shifted carrier signal corresponding to a particular receiving neuron and including means for routing said respective shifted carrier signal to said particular receiving neuron; and receiving neuron input means connected to the filter window means and to the particular receiving neuron for converting said respective shifted carrier signal into a synaptic impulse stream having a frequency and a polarity corresponding respectively to the magnitude and sign of the frequency difference between the modulation frequency of said respective shifted carrier signal and the carrier frequency corresponding to the particular receiving neuron.

4. A communication circuit according to claim 3, said carrier stepper means comprising:

carrier increment means for changing said carrier frequency in synchronism with said sequence of weight signals;

carrier dwell means connected to said carrier increment means, for holding said carrier frequency unchanged for a finite settling time after said carrier frequency is changed; and carrier sequence restart means connected to said carrier increment means, for resetting said carrier frequency to an initial value.

5. A communication circuit according to claim 4, said filter window means comprising:

bandpass filter means connected to said commutator means, said bandpass filter means being tuned to pass only those signals having a frequency substantially equal to the frequency of the shifted carrier signal corresponding to said receiving neuron.

6. In a neural network interconnecting a plurality of neurons, a method for communicating an activity state of a transmitting neuron to a plurality of receiving neurons, the method comprising the steps of:

providing a plurality of weight signals, each having a weight frequency corresponding to a weight assigned to a connection between said transmitting neuron and at least one neuron of said receiving neurons;

generating a sequence of carrier signals, each having a respective carrier frequency corresponding to a respective receiving neuron;

for each carrier signal within said sequence, generating a shifted carrier signal having a modulation frequency that differs from the carrier frequency of said carrier signal by an amount representing the product of a corresponding weight and said transmitting neuron activity state;

filtering said sequence of carrier signals to select a respective shifted carrier signal corresponding to a particular receiving neuron;

routing said respective shifted carrier signal to said particular receiving neuron;

converting said shifted carrier signal into a synaptic impulse stream having a frequency and polarity corresponding respectively to the magnitude and sign of the frequency difference between the modulation frequency of said shifted carrier signal and said carrier frequency; and providing said synaptic impulse stream to said particular receiving neuron.

* * * * *